United States Patent Office 2,790,798
Patented Apr. 30, 1957

2,790,798

PREPARATION OF SULFANILAMIDOPYRIDAZINE

Margaret M. Lester, San Francisco, Calif., and Jackson P. English, Stamford, Conn., assignors to American Cyanamid Company, New York, N. Y., a corporation of Maine No Drawing. Application January 18, 1955, Serial No. 482,666

5 Claims. (Cl. 260—239.7)

This invention relates to a method of preparing sulfanilamido pyridazine and the $N^4$-acyl derivatives thereof.

In our United States Patent 2,671,086 which issued March 2, 1954, we described the preparation of 3,6-dichloropyridazine and the use of this compound to prepare 3-sulfanilamido-6-chloropyridazine.

In United States Patent 2,371,115, issued March 6, 1945, a number of para-substituted benzene sulfanilamidopyridazines are described which have chemotherapeutic activity and are valuable intermediates for the production of azo dyes of extraordinary light fastness. Several methods of preparing sulfanilamidopyridazines are referred to in that patent. Unfortunately, however, the yields that are obtained are low, only about 15% in the last step, and several preceding steps are necessary. Because of this, the commercial development of sulfanilamidopyridazine for its several purposes has been retarded.

In our copending application, Serial Number 400,376, filed December 24, 1953, now United States Patent 2,712,011, we describe and claim a method of reacting 3,6-dichloropyridazine with sulfanilamide and $N^4$-acylsulfanilamides to yield (para-substituted benzene sulfanilamido)-6-chloropyridazines with very good yields. The present application, which is a continuation-in-part of application, Serial Number 400,376, filed December 24, 1953, claims the process of converting 3-sulfanilamido-6-chloropyridazine and $3N^4$-acylsulfanilamido-6-chloropyridazines to sulfanilamidopyridazine and $3N^4$-acylsulfanilamidopyridazines, respectively. The process of the present invention therefore represents an improvement over the method described in United States Patent 2,371,115. In fact, the present process is the only process ever described which would make the commercial preparation of sulfapyridazines feasible. In preparing the compounds of the present invention the 3-sulfanilamido-6-chloropyridazine or a $N^4$-acyl derivative thereof is dissolved in a solution of an acid acceptor such as alkali metal carbonates or hydroxides. This solution is then treated with a dehydrohalogenation catalyst such as platinum, palladium, etc. in an atmosphere of hydrogen. The desired product is obtained from the reaction mixture as described hereinafter in the examples.

To illustrate the invention in greater particularity the following examples are given. All parts are by weight unless otherwise indicated.

Example 1

1.9 parts of 3,6-dichloropyridazine, 3.4 parts of sulfanilamide, 2.7 parts of potassium carbonate and one part of sodium chloride were ground together. The solid mixture was heated with stirring and as the dichloropyridazine and sulfanilamide melted, the mixture became a slurry. When the bath temperature had reached 140° C. a sudden evolution of carbon dioxide occurred which lasted about five minutes, after which the mixture set in fine granules. When no more carbon dioxide was evolved, heating was stopped and the reaction mixture was heated with sufficient water to dissolve it and the solution allowed to cool. Unreacted sulfanilamide was collected by filtration. Excess dichloropyridazine was removed from the filtrate by extraction with a water immiscible organic solvent such as ether. The basic solution was chilled and poured into one-half volume of 1:3 acetic acid. Sufficient hydrochloric acid was added to bring the mixture to pH 4. The crude 3-sulfanilamido-6-chloropyridazine which precipitated was purified by solution in 6 parts of 1:100 ammonium hydroxide, charcoal treatment and precipitation by pouring of the filtrate into dilute acetic acid. This new compound was found to have physiological activity.

In place of the potassium carbonate used above, it is possible to employ other acid acceptor substances such as sodium carbonate, barium carbonate, sodium bicarbonate, and the like. Other basic substances such as sodium hydroxide, potassium hydroxide may be used but, however, with not such efficient results in view of the tendency of these substances to react with the dichloropyridazine.

As noted, one of the principal advantages of the invention is that the compound 3-sulfanilamido-6-chloropyridazine is readily converted to 3-sulfanilamidopyridazine by reduction. An example of this will now be given.

A solution of 1.5 parts of 3-sulfanilamido-6-chloropyridazine in one part of 40% sodium hydroxide and four parts of water was shaken under an atmosphere of hydrogen for one hour with 0.15 part of 10% platinum-charcoal catalyst and 0.15 part of 10% palladium-charcoal catalyst. The solution was filtered free of catalyst and poured into three volumes of 1:8 acetic acid. Product precipitated amounting to 53% of theoretical yield. Additional product was obtained by leaching of the catalyst. These crude materials were purified by heating fifteen minutes with decolorizing carbon in a solution of 20 volumes of 1:100 ammonium hydroxide and precipitation of the filtrate by pouring into acetic acid solution. Total recovery of material melting 187° C. to 188° C. was 86% of theory. This 3-sulfanilamidopyridazine is a known compound which has been previously reported as having antibacterial activity.

Example 2

4.3 parts $N^4$-acetylsulfanilamide, 2.1 parts of dichloropyridazine, 2.8 parts of potassium carbonate, and 1.0 part of sodium chloride were ground together and heated gently, with stirring. When temperature reached 170° C. an evolution of carbon dioxide occurred and then the mixture set to a hard mass. The mixture was dissolved in sufficient water and allowed to cool. Unreacted $N^4$-acetylsulfanilamide was recovered by filtration and excess dichloropyridazine was removed from the filtrate by ether extraction. The basic solution was chilled and acidified slowly with 1:3 acetic acid to pH 4. The crude $3N^4$-acetylsulfanilamido-6-chloropyridazine which precipitated was purified by solution in 6 parts 1:100 ammonium hydroxide, charcoal treatment and precipitation by acidifying filtrate with 1:3 acetic acid.

A solution of 1.5 parts of $3N^4$-acetylsulfanilamido-6-chloropyridazine in one part of 40% sodium hydroxide and 4 parts of water was shaken under a hydrogen atmosphere for one hour with 0.15 part of 10% platinum-charcoal catalyst and 0.15 part of 10% palladium-charcoal catalyst. The solution was filtered free of catalyst and poured into 5 volumes 1:3 acetic acid to precipitate the $3N^4$-acetylsulfanilamidopyridazine.

Example 3

One part of $3N^4$-acetylsulfanilamidopyridazine was dissolved in 10 parts 10% sodium hydroxide and 2 parts water and heated in a boiling water bath for 30 minutes. The solution was chilled and acidified slowly with 1:3 acetic acid. The 3-sulfanilamidopyridazine which formed was filtered off.

We claim:

1. In a method of preparing a 3-sulfanilamidopyridazine compound having the following formula:

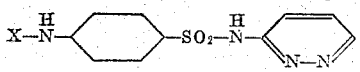

from a 3-sulfanilamido-6-chloropyridazine compound having the following formula:

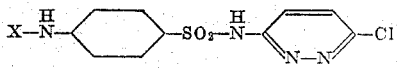

wherein X is a substituent selected from the class consisting of hydrogen and an

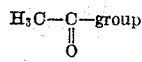

the steps which comprise reacting at substantially room temperature the said 6-chloro compound with sufficient hydrogen in the presence of a dehydrohalogenating agent of the group consisting of platinum and palladium in aqueous alkaline medium to replace the chlorine with hydrogen and produce the corresponding chlorine-free compound and recovering the chlorine-free 3-sulfanilamidopyridazine compound so produced.

2. A method in accordance with claim 1 in which the 3-sulfanilamidopyridazine is 3-(para-amino-benzene-sulfonamido)-pyridazine, the dehydrohalogenating agent is palladium, and the reaction is carried out in aqueous alkali metal hydroxide solution.

3. A method in accordance with claim 1 in which the 3-sulfanilamidopyridazine is $3N^4$-acetylsulfanilamido-pyridazine, the dehydrohalogenating agent is palladium, and the reaction is carried out in aqueous alkali metal hydroxide solution.

4. A method of preparing 3-sulfanilamidopyridazine which comprises the steps of reacting sulfanilamido-6-chloropyridazine with sufficient hydrogen in the presence of platinum catalyst in aqueous alkali metal hydroxide solution at substantially room temperature to replace the chlorine with hydrogen and produce the corresponding chlorine-free compound and recovering the said chlorine-free compound therefrom.

5. A method of preparing $3N^4$-acetylsulfanilamido-pyridazine which comprises the steps of reacting $3N^4$-acetylsulfanilamido-6-chloropyridazine with sufficient hydrogen in the presence of platinum catalyst in aqueous alkali metal hydroxide solution at substantially room temperature to replace the chlorine with hydrogen and produce the corresponding chlorine-free compound and recovering said chlorine-free compound therefrom.

References Cited in the file of this patent
UNITED STATES PATENTS

| Number | Name | Date |
|---|---|---|
| 2,242,079 | Kuh et al. | May 13, 1941 |
| 2,344,707 | Kuh et al. | Mar. 21, 1944 |
| 2,425,248 | Kuh et al. | Aug. 5, 1947 |
| 2,671,086 | Rogers et al | Mar. 2, 1954 |
| 2,699,054 | Conover | Jan. 11, 1955 |
| 2,712,011 | Rogers et al. | June 28, 1955 |